(12) United States Patent
Draznin et al.

(10) Patent No.: US 9,037,650 B2
(45) Date of Patent: May 19, 2015

(54) DEVICE-AGNOSTIC CLOUD AND DEVICE-BASED USER TO USER COMMUNICATION TIMELINE/MOSAIC

(71) Applicants: Verizon Patent and Licensing, Inc., Basking Ridge, NJ (US); Cellco Partnership, Basking Ridge, NJ (US)

(72) Inventors: Sagiv Draznin, Walnut Creek, CA (US); Lalit R. Kotecha, San Ramon, CA (US); Patricia R. Chang, San Ramon, CA (US); Priscilla Lau, Fremont, CA (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 148 days.

(21) Appl. No.: 13/647,958

(22) Filed: Oct. 9, 2012

(65) Prior Publication Data
US 2014/0101245 A1  Apr. 10, 2014

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 51/32* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 2007/0058569 A1* | 3/2007 | McMenamin et al. | 370/254 |
| 2009/0106366 A1* | 4/2009 | Virtanen et al. | 709/206 |
| 2009/0319941 A1* | 12/2009 | Laansoo et al. | 715/784 |
| 2011/0208816 A1* | 8/2011 | Chavez | 709/206 |
| 2013/0024521 A1* | 1/2013 | Pocklington | 709/206 |
| 2013/0097546 A1* | 4/2013 | Gardenfors et al. | 715/772 |

* cited by examiner

*Primary Examiner* — Nicholas Taylor
*Assistant Examiner* — Clayton R Williams

(57) ABSTRACT

A device may receive a request to update a data structure with first communication information from multiple applications. The first communication information may identify communications made, by a particular user, using the applications, and the applications may be associated with different modes of communication. The device may request the first communication information from devices storing the first communication information, may receive the first communication information, and may store the first communication information in the data structure. The device may receive criteria identifying requested communications, and may search the data structure to determine second communication information. The second communication information may identify the requested communications that satisfy the criteria. The device may provide the second communication information to a user device associated with the particular user.

20 Claims, 11 Drawing Sheets

| User/Account 610 | Contact 620 | User Device 630 | Application 640 | Time 650 | Location 660 | Content 670 |
|---|---|---|---|---|---|---|
| Joe Smith | Sam Fisher | Joe's cell phone | Text Messaging | 5:05 pm 9/27/2012 | Key West, Florida | Hi Sam! The weather here is great. |
| Joe Smith | Sam Fisher | Joe's PC | E-mail | 5:10 pm 9/27/2012 | Key West, Florida | Hey Joe, check out this picture I took of home. |
| Joe Smith | Mike Smith | Joe's Tablet | Voice Messaging | 12:01 am 1/1/2013 | New York, New York | Happy New Year! |
| Joe Smith | Mom, Dad | Joe's PC | Social Media App | 6:30 pm 12/25/2012 | Washington, DC | Look at the puppy I got for Christmas! |

FIG. 6

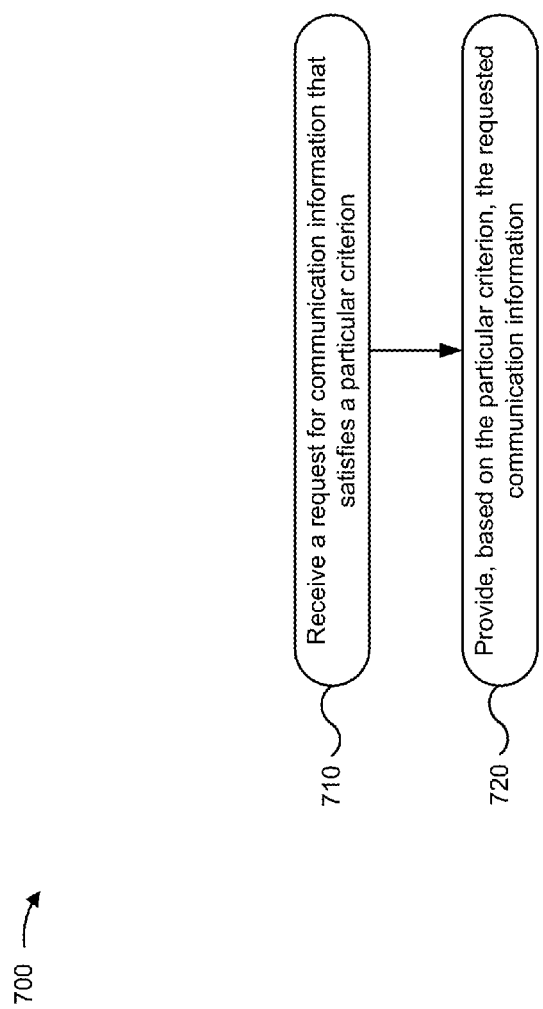

DEVICE-AGNOSTIC CLOUD AND DEVICE-BASED USER TO USER COMMUNICATION TIMELINE/MOSAIC

BACKGROUND

Users may communicate with one another using a variety of devices and applications. For example, users may use mobile devices, personal computers, and other devices to communicate with one another via text messaging, e-mail, chat, social media, voice calls, etc.

BRIEF DESCRIPTION OF THE DRAWINGS

FIG. 6 is a diagram of an example data structure that stores communication information;

FIG. 7 is a flow chart of an example process for providing requested communication information.

DETAILED DESCRIPTION OF PREFERRED EMBODIMENTS

The following detailed description of example implementations refers to the accompanying drawings. The same reference numbers in different drawings may identify the same or similar elements.

Users may communicate with one another using a variety of devices and applications. For example, users may use mobile devices, personal computers, and other devices to communicate with one another via text messaging, e-mail, chat, social media, voice calls, etc. A user may wish to view a particular communication, but may not remember which device or application the user used to make the communication. Implementations described herein may allow users to easily view communications by aggregating communications across multiple devices and/or applications, and allowing the communications to be searched, for example, by contact, by content, by time, and/or by location.

Figure 1:
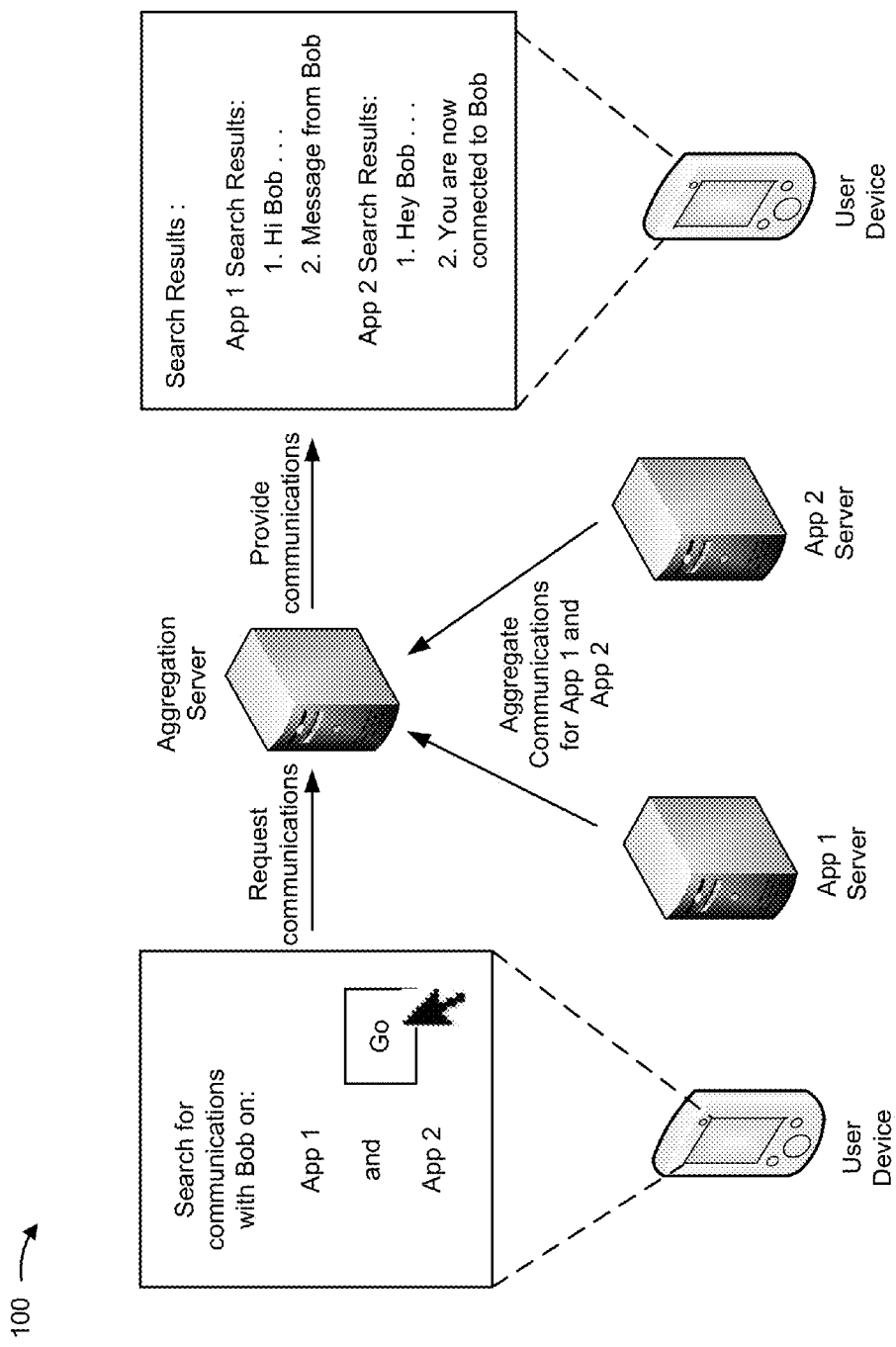
FIG. 1 is a diagram of an overview of an example implementation described herein.

FIG. 1 is a diagram of an overview of an example implementation 100 described herein. As shown in FIG. 1, example implementation 100 may include a user device, an aggregation server, and multiple application servers (e.g., "App 1 server" and "App 2 server"). In some implementations, the user device may be a mobile phone, and the aggregation server and the application servers may be server computers.

As further shown in FIG. 1, a user may interact with the user device in order to search for communications made using multiple applications (e.g., "App 1" and "App 2"), such as a text messaging application, a social media application, a voice application, an e-mail application, or another application that allows a user to communicate with another user. The user may specify search criteria for a search query, such as another user (e.g., a contact) with which the communication was made, a time period during which the communication was made, a location of the user (or the contact) when the communication was made, contents of the communication, an application used to make (e.g., send or receive) the communication, etc. For example, a user may search for communications, with a contact named "Bob," that were made using two different applications "App 1" and "App 2" as illustrated.

As further shown in FIG. 1, the search query may trigger the aggregation server to provide communications, that satisfy the search criteria, to the user device. For example, the aggregation server may include a data structure that stores communications. The aggregation server may update the data structure by requesting communications from the application servers, and may receive the requested communications from the application servers (e.g., App 1 server and App 2 server, which may host and/or store information associated with App 1 and App 2, respectively). The aggregation server may analyze the communications received from the application servers (e.g., stored in the aggregation server data structure) using the search criteria, and may provide communications, that match the search criteria, to the user device for display, as illustrated.

Figure 2:
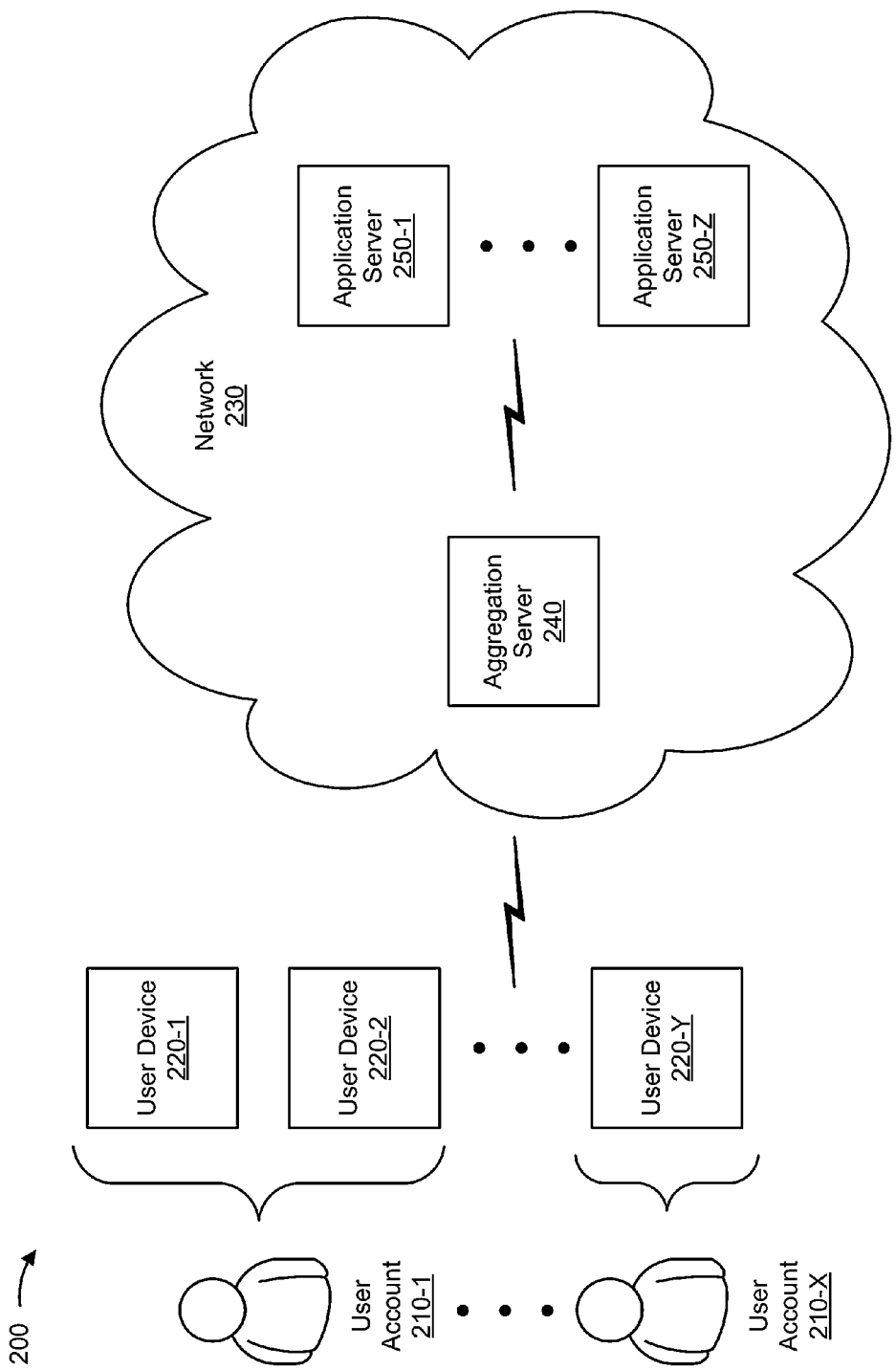
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more users associated with one or more user accounts 210-1 through 210-X (X≥1) (hereinafter referred to collectively as "user accounts 210," and individually as "user account 210"), one or more user devices 220-1, 220-2 through 220-Y (Y≥1) (hereinafter referred to collectively as "user devices 220," and individually as "user device 220"), and a network 230. Network 230 may include an aggregation server 240 and one or more application servers 250-1 through 250-Z (Z≥1) (hereinafter referred to collectively as "application servers 250," and individually as "application server 250").

User account 210 may include an account and/or a subscription associated with one or more users (e.g., subscribers). User account 210 may be associated with one or more user devices 220. For example, a user of user account 210 may use one or more user devices 220 to access user account 210 and/or to communicate with other users.

User device 220 may include a device, such as a wired and/or wireless communication device, that is capable of communicating with other devices (e.g., other user devices 220, devices in network 230, etc.). For example, user device 220 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a computer (e.g., a desktop computer, a laptop computer, a tablet computer, etc.), a set-top box, a television, a personal gaming system, and/or another similar type of device.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Aggregation server 240 may include one or more server devices, and/or other types of devices, that gather, process, search, store, and/or provide information in a manner described herein. In some implementations, aggregation server 240 may request, receive, aggregate, and/or analyze communication information received from application servers 250. Additionally, or alternatively, aggregation server 240 may provide communication information to user device 220 based on a request (e.g., a search query) received from user device 220.

Application server 250 may include one or more server devices, and/or other types of devices, that gather, process, search, store, and/or provide information in a manner described herein. In some implementations, application server 250 may host and/or execute applications and/or services, such as an application that permits user devices 220 to communicate with one another. Additionally, or alternatively, application server 250 may store communication information associated with communications made using an application. For example, application server 250 may host one or more applications that allow user devices 220 to communicate via text message, voice, video messaging (e.g., voice over IP), chat, e-mail, social media, voicemail (e.g., searchable voicemail), etc.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
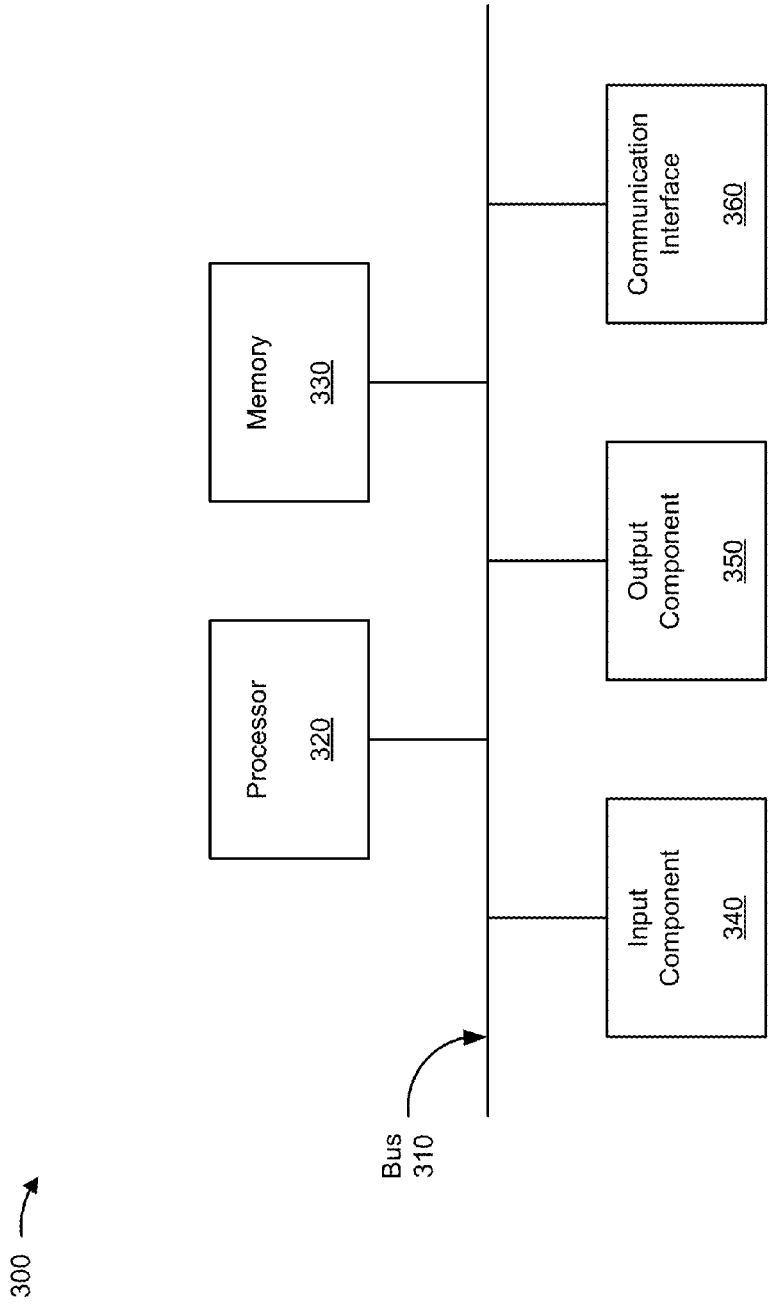
FIG. 3 is a diagram of example components of one or more devices of FIG. 2.

FIG. 3 is a diagram of example components of a device 300. Device 300 may correspond to user device 220, aggregation server 240, and/or application server 250. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of user device 220, aggregation server 240, and/or application server 250 may include one or more devices 300 and/or one or more components of device 300.

Figure 4:
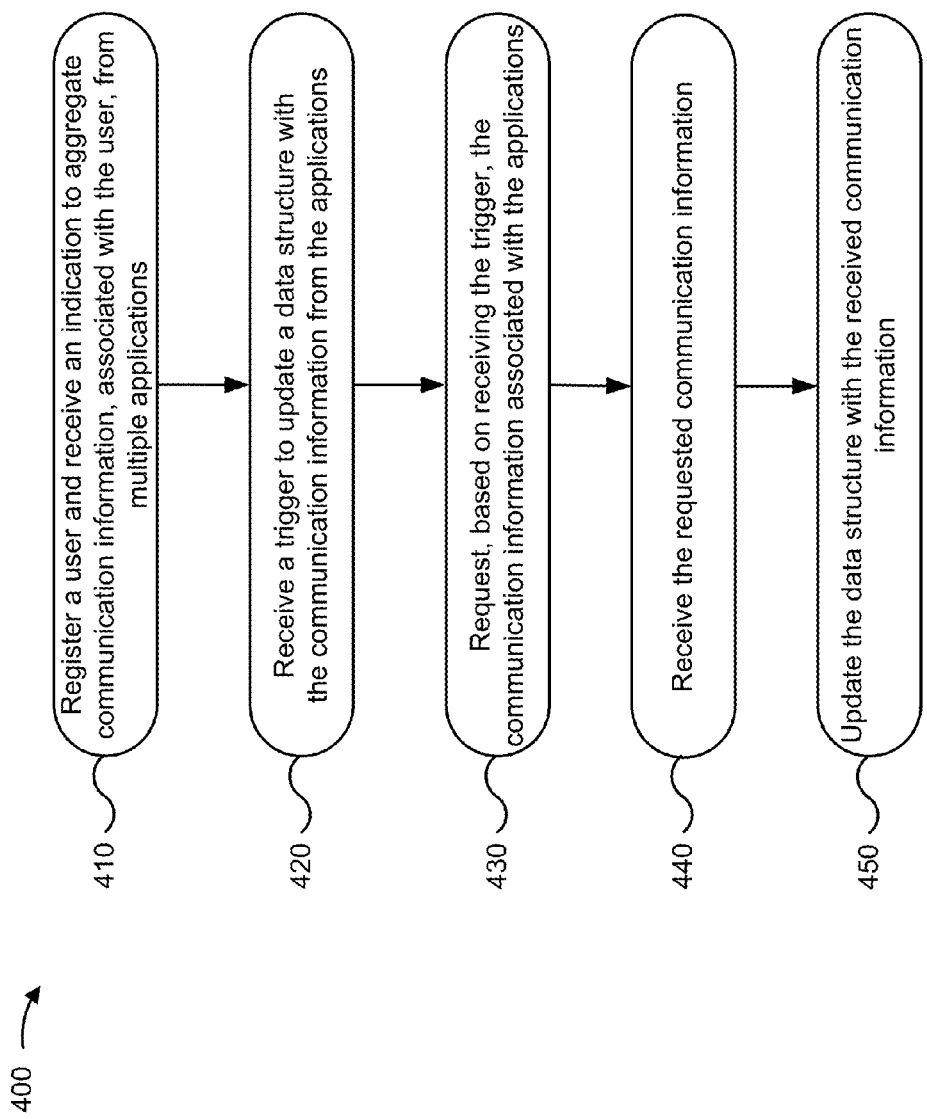
FIG. 4 is a flow chart of an example process for updating a data structure with communication information.

FIG. 4 is a flow chart of an example process 400 for updating a data structure with communication information. In some implementations, one or more process blocks of FIG. 4 may be performed by one or more components of aggregation server 240. Additionally, or alternatively, one or more process blocks of FIG. 4 may be performed by one or more components of another device or a collection of devices including or excluding aggregation server 240.

As shown in FIG. 4, process 400 may include registering a user and receiving an indication to aggregate communication information, associated with the user, from multiple applications (block 410). In some implementations, a user (e.g., associated with user account 210) may register with an aggregation service provided by aggregation server 240. Additionally, or alternatively, aggregation server 240 may receive (e.g., from user device 220) an indication to aggregate communication information, associated with the user, from multiple applications. For example, the user may select applications, used to make communications, and aggregation server 240 may receive an indication of the selected applications. The multiple applications may be associated with different modes of communication, such as voice communications, video communications, text communications, social media communications, picture communications, etc. Aggregation server 240 may aggregate the communication information from the multiple applications.

The communication information may include any information associated with a communication made by a user. For example, the communication information may include information identifying one or more users associated with the communication. For example, the communication information may include information that identifies a user that transmitted the communication, a user to whom the communication was transmitted, a user that received the communication, a user that participated in the communication (e.g., responded to the communication, viewed the communication, etc.). As used herein, a "user" may include a user of a user device 220, a user of an application, a subscriber, a contact, a user account 210, or the like. Information that identifies the user may include a phone number, a user account name, a contact name, a user name, etc.

In some implementations, the communication information may include information associated with a user device 220 used to make the communication, such as a network address of the user device, a type of user device, a user device identifier, etc. Additionally, or alternatively, the communication information may identify content of the communication (e.g., words used in the communication, a subject of the communication, files included in the communication, etc.), a time associated with the communication (e.g., a time/date the communication was transmitted, a time/date the communication was received, a duration of a communication, etc.), a location associated with the communication (e.g., a geographic location of a user device 220 used to send or receive the communication), and/or an application used to make the communication (e.g., a text messaging application, a social media application, a voice application, a telephone application, an e-mail application, a chat application, a content-sharing application, an application that allows a user to make and/or receive phone calls, etc.).

The user may opt out of having communication information aggregated at any time. Moreover, the user may control exactly the type of communication information that is aggregated.

Additionally, or alternatively, a user may specify a user device 220 from which to aggregate communication information, a type of user device 220 from which to aggregate communication information (e.g., a particular user device 220, such as a particular mobile phone; every tablet device associated with user account 210; etc.). In some implementations, a user may specify one or more devices and one or more applications on the devices from which to aggregate the communication information.

As further shown in FIG. 4, process 400 may include receiving a trigger to update a data structure with communication information from multiple applications (block 420). In some implementations, the data structure may be stored in aggregation server 240. In some implementations, the trigger may include user registration for an aggregation service, provided by aggregation server 240. For example, a user may register (e.g., via an application running on user device 220) to have the user's communications aggregated by aggregation server 240, and aggregation server 240 may create and/or update, based on the registration, a data structure that includes the user's communications. For example, aggregation server 240 may update the data structure by requesting and/or receiving communication information from application servers 250 and/or user devices 220.

Additionally, or alternatively, aggregation server 240 may periodically update the data structure with a user's communication information. For example, the trigger may include an expiration of a timer (e.g., after a particular amount of time has passed since the last update, for example, a minute, an hour, a day, etc.), and aggregation server 240 may update the data structure based on the timer expiration. Additionally, or alternatively, aggregation server 240 may receive a notification that a user has made a new communication using user device 220 and/or an application hosted by application server 250. For example, aggregation server 240 may receive communication information from application servers 250 and/or user devices 220 as the user makes new communications using applications hosted by application servers 250.

Additionally, or alternatively, aggregation server 240 may update the data structure based on receiving a request from user device 220 (e.g., a user request that communication information be updated/synched, a user login to the aggregation service, etc.). For example, a user of user device 220 may request that the data structure be updated. User device 220 may transmit the request to aggregation server 240, and aggregation server 240 may update the communication information stored in the data structure based on receiving the request.

As further shown in FIG. 4, process 400 may include requesting, based on receiving the trigger, the communication information associated with the applications (block 430), receiving the requested communication information (block 440), and updating the data structure with the received communication information (block 450). In some implementations, aggregation server 240 may request and/or receive the communication information from a user device 220 used to make the communication. Additionally, or alternatively, aggregation server 240 may request and/or receive the communication information from an application server 250 that hosts an application used to make (e.g., send or receive) communications and/or that stores communication information associated with communications made using the application. Aggregation server 240 may update the data structure, stored in aggregation server 240, by adding the received communication information to the data structure.

In some implementations, aggregation server 240 may store user credentials, provided by user device 220, and may request the communication information from application server 250 using the user credentials. For example, a user may register with an aggregation service provided by aggregation server 240, and may provide a username and password used to access the user's account on a social media application. Aggregation server 240 may use the username and password to access the user's account on the social media application (e.g., via application server 250 that stores communications made using the social media application), and may download communication information, associated with the users' account, to update the data structure.

While a series of blocks has been described with regard to FIG. 4, the order of the blocks may be modified in some implementations. Additionally, or alternatively, non-dependent blocks may be performed in parallel.

Figure 5:
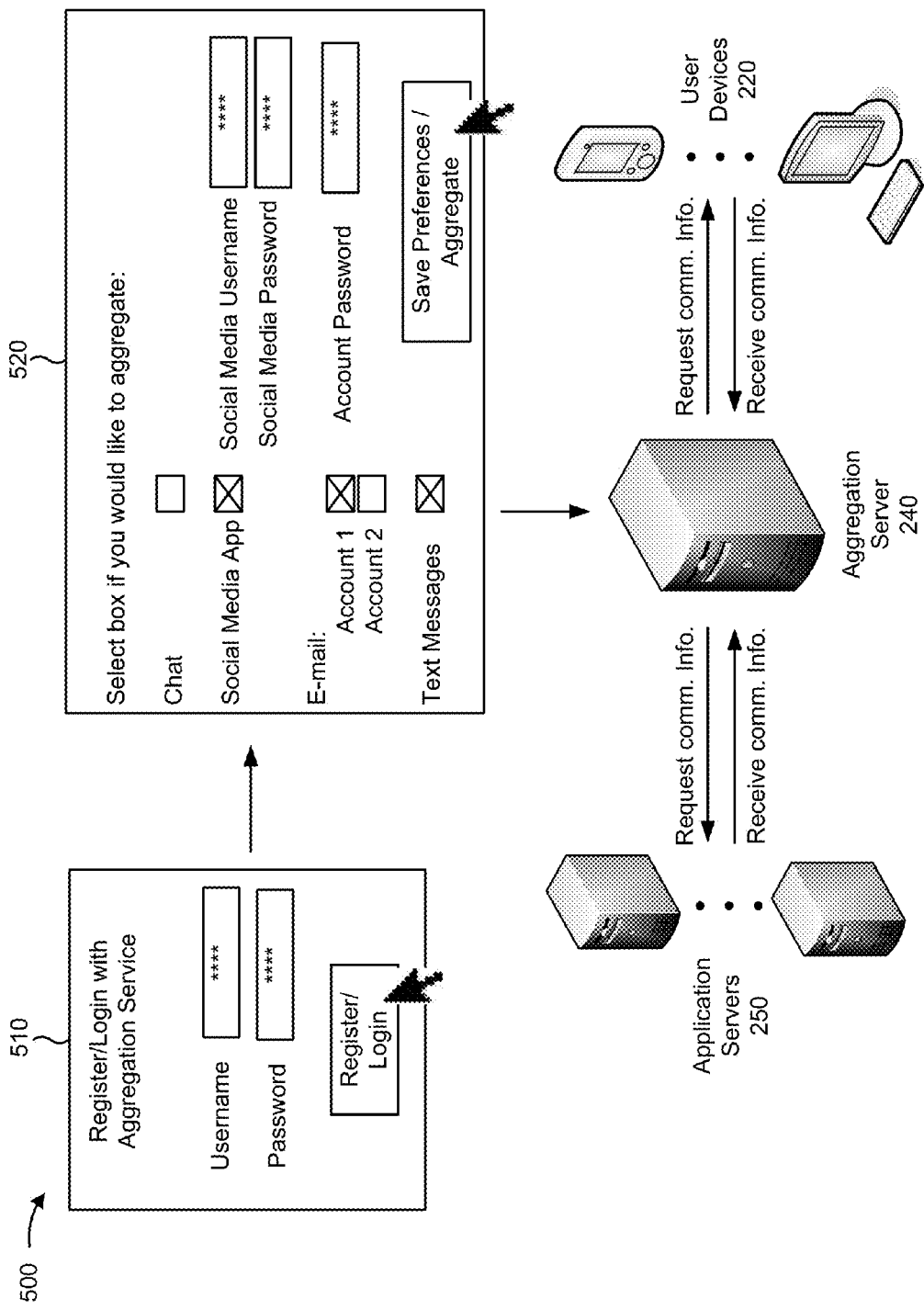
FIG. 5 is a diagram of an example implementation relating to the process shown in FIG. 4.

FIG. 5 is a diagram of an example implementation 500 relating to the process shown in FIG. 4. FIG. 5 shows an implementation 500 where a user registers with an aggregation service (via user interface 510) and selects applications from which to aggregate communication information (via user interface 520), and where aggregation server 240 requests and receives the communication information from application servers 250 and user devices 220.

As shown in FIG. 5, a user may interact with a user interface 510 in order to register for an aggregation service. In some implementations, user interface 510 may be displayed on user device 220. As shown in user interface 510, the user may register and/or log in to the aggregation service by inputting a username and password (e.g., via a text box), and by interacting with an input mechanism (e.g., a "Register/Login" button, as illustrated).

As further shown in FIG. 5, the user may interact with a user interface 520 in order to select one or more applications from which to aggregate communication information. In some implementations, user interface 520 may be displayed on user device 220, and may be displayed after a user has registered and/or logged in (e.g., via user interface 510). As shown in user interface 520, the user may select one or more applications (e.g., via a check box). As further shown in user interface 520, the user may input user credentials (e.g., a username and password) for one or more of the applications. For example, a user may select to aggregate communication information from a social media application, a first e-mail account, and a text messaging service, as illustrated. In order to aggregate communication information from the social media application and the e-mail account, the user may be required to input a username and/or a password, as illustrated. User interface 520 may provide a mechanism (e.g., a "Save Preferences/Aggregate" button) for a user to trigger aggregation of communication information for the selected applications, and/or to save the user's input so that communication information for the selected applications may be periodically aggregated.

As further shown in FIG. 5, aggregation server 240 may use the input from user interface 520 to aggregate communication information for the selected applications. For example, aggregation server 240 may use a set of rules to determine an application server 250 and/or a user device 220 from which to request and/or receive the communication information for a selected application. Based on the rules and the selected applications, aggregation server 240 may request and/or receive communication information from application servers 250 and/or user device 220, as illustrated. Aggregation server 240 may update a data structure with the communication information.

The information illustrated in FIG. 5, such as the applications, is provided for explanatory purposes. In practice, implementation 500 may include additional information, less information, or different information than illustrated in FIG. 5.

FIG. 6 is a diagram of an example data structure 600 that stores communication information. Data structure 600 may be stored in a memory device (e.g., a RAM, a hard disk, etc.), associated with one or more devices shown in FIG. 2. For example, data structure 600 may be stored by aggregation server 240. Additionally, or alternatively, data structure 600 may be stored by user device 220 application server 250, and/or another device.

Data structure 600 may include a collection of fields, such as a user/account field 610, a contact field 620, a user device field 630, an application field 640, a time field 650, a location field 660, and a content field 670.

User/account field 610 may store information that identifies a user and/or a user account 210 associated with a communication. For example, user/account field 610 may identify a user that transmitted the communication, a user to whom the communication was transmitted, a user that received the communication, a user that participated in the communication (e.g., responded to the communication, viewed the communication, etc.), or the like.

Contact field 620 may also store information that identifies a user and/or a user account 210 associated with the communication, as described with respect to user/account field 610. In some implementations, user/account field 610 and contact field 620 may be combined into a single field that identifies every user associated with the communication. In some implementations, multiple users and/or user accounts 210 may be identified by user/account field 610 and/or contact field 620.

User device field 630 may store information that identifies a user device 220 used by the user identified by user/account field 610 to participate in the communication. For example, user device field 630 may identify a user device 220 that sent the communication, a user device 220 that received the communication, a user device 220 used to respond to the communication, a user device 220 used to view the communication, etc. In some implementations, the information may include a network address associated with user device 220, such as a telephone number, an internet protocol (IP) address, etc. Additionally, or alternatively, the information may include a device identifier (e.g., a mobile equipment identifier (MEID), an international mobile subscriber identity (IMSI), a service programming code (SPC), etc.).

Application field 640 may store information that identifies an application used by the user identified by user/account field 610 to participate in the communication. For example, application field 640 may identify an application used to send the communication, an application used to receive the communication, an application used to respond to the communication, an application used to view the communication, etc.

Time field 650 may store information that identifies a date and/or a time at which the user identified by user/account field 610 participated in the communication. For example, time field 650 may identify a date/time that a communication was sent, received, responded to, viewed, etc. In the case of a voice and/or video call, time field 650 may store information that identifies a duration of the communication and/or a time the communication ended.

Location field 660 may store information that identifies a geographic location at which the user identified by user/account field 610 participated in the communication. For example, location field 660 may identify a geographic location (e.g., a global positioning system (GPS) location, a cellular base station triangulation location, etc.) of user device 220, identified by user device field 630, when user device 220 was used to participate in the communication. For example, location field 660 may identify a geographic location of user device 220 when user device 220 was used to send, receive, respond to, view, etc. the communication.

Content field 670 may store information that identifies content of the communication made by the user identified by user/account field 610. For example, the content may include words, characters, numbers, letters, strings, etc. used in the communication, a subject of the communication, a file included in the communication (e.g., sent as an attachment), etc.

Information associated with a communication may be conceptually represented as a row in data structure 600. For example, the first row in data structure 600 may correspond to a communication sent by "Joe Smith" to "Sam Fisher" using "Joe's cell phone." The communication may have been sent using a "text messaging" application at "5:05 pm" on "Sep. 27, 2012" from "Key West, Fla." The content of the communication may be "Hi Sam! The weather here is great." While the data structure 600 depicted in FIG. 6 shows aggregated communication information for communications made by Joe Smith, data structure 600 may store similar information for other users.

The number of fields illustrated in FIG. 6 is provided for explanatory purposes. In practice, data structure 600 may include additional fields, fewer fields, different fields, or differently arranged fields than those illustrated in FIG. 6. Furthermore, while data structure 600 is represented as a table with rows and columns, in practice, data structure 600 may include any type of data structure, such as a linked list, a tree, a hash table, a data structure, or another type of data structure. In some implementations, data structure 600 may include information generated by a device and/or a component. Additionally, or alternatively, data structure 600 may include information provided from another source, such as information provided by a user, and/or information automatically provided by a device.

FIG. 7 is a flow chart of an example process 700 for providing requested communication information. In some implementations, one or more process blocks of FIG. 7 may be performed by one or more components of aggregation server 240. Additionally, or alternatively, one or more process blocks of FIG. 7 may be performed by one or more components of another device or a collection of devices including or excluding aggregation server 240.

As shown in FIG. 7, process 700 may include receiving a request for communication information that satisfies a particular criterion (block 710). In some implementations, aggregation server 240 may receive a request for particular communication information from user device 220. For example, a user of user device 220 may use a search query to request communication information that meets a search criterion. In some implementations, aggregation server 240 may receive multiple search criteria.

The search criteria may include any communication information described herein, such as the communication information stored in data structure 600. For example, the user may request communication information for communications made using a particular user account 210, communications with a particular contact (e.g., communications sent to and/or received from another user and/or user account 210), communications made using a particular user device 220, communications made using a particular application, communications made at a particular time and/or during a particular time period, communications made at a particular geographic location, communications that includes content that satisfies a particular search criterion (e.g., communications that include a particular word, subject, file, etc.), etc. The user request, including the search query and/or the search criteria, may be transmitted by user device 220, and may be received by aggregation server 240.

As further shown in FIG. 7, process 700 may include providing, based on the particular criterion, the requested communication information (block 720). In some implementations, aggregation server 240 may search a data structure using the particular criterion in order to retrieve communication information that satisfies the particular criterion. Aggregation server 240 may provide the retrieved communication information for display on user device 220. In some implementations, the user device 220 that receives the communication information may be different from the user device 220 used to make the communication associated with the communication information.

In some implementations, aggregation server 240 may provide the requested communication information for display in a particular manner on user device 220. For example, aggregation server 240 may provide the communication information for display on a timeline based on a date/time associated with a communication, on a map based on a location associated with a communication, by type of user device 220 used to make the communication, by type of application used to make the communication, by a contact associated with the communication, etc.

While a series of blocks has been described with regard to FIG. 7, the order of the blocks may be modified in some implementations. Additionally, or alternatively, non-dependent blocks may be performed in parallel.

Figure 8:
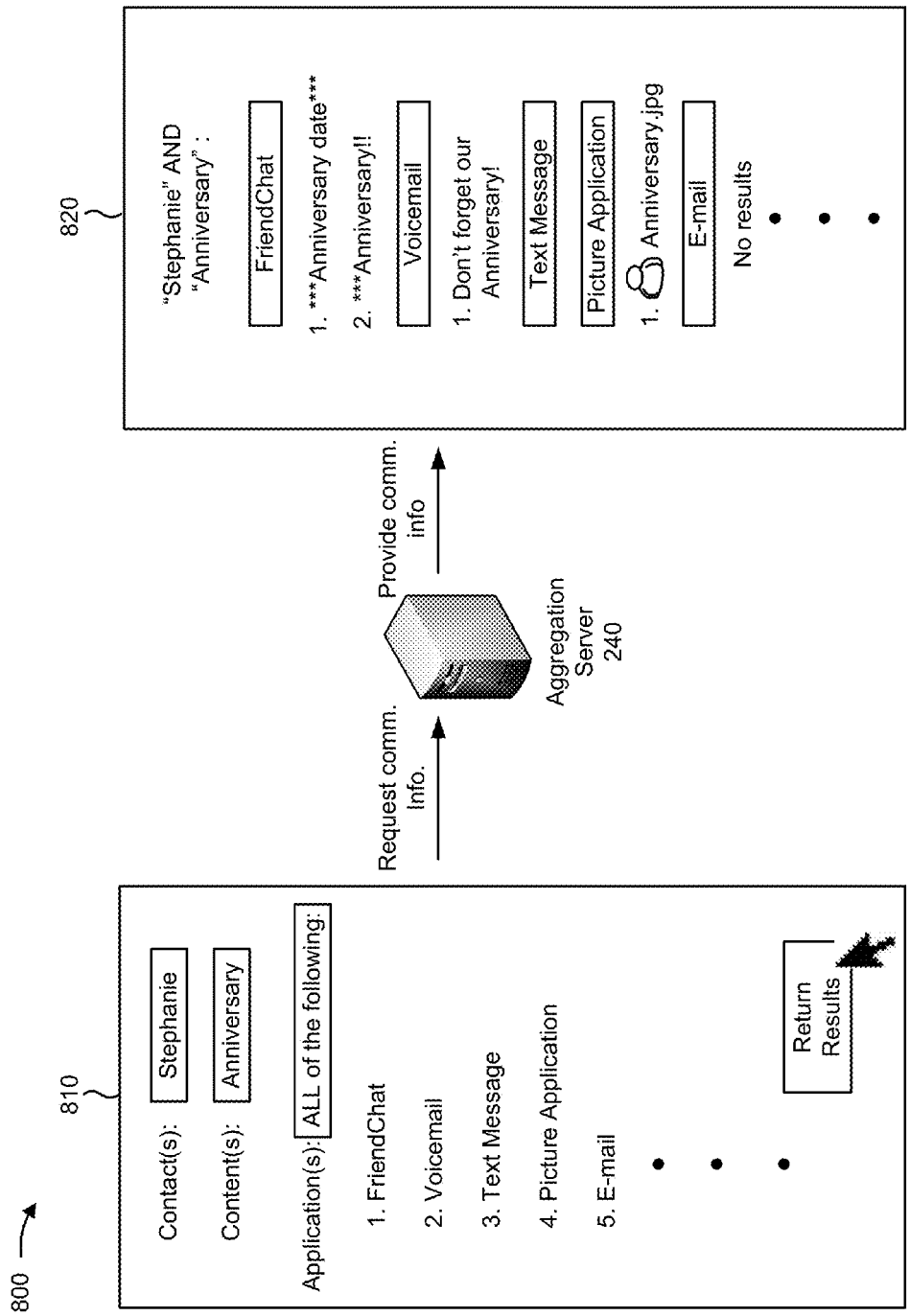
FIGS. 8-11 are diagrams of example implementations relating to the process shown in FIG. 7.

FIG. 8 is a diagram of an example implementation 800 relating to the process shown in FIG. 7. FIG. 8 shows an implementation 800 where a user inputs search criteria (via user interface 810), and where aggregation server 240 receives the search criteria and provides communication information, based on the search criteria, for display on user device 220 (e.g., via user interface 820).

As shown in FIG. 8, a user may interact with a user interface 810 to request particular communication information from aggregation server 240. In some implementations, user interface 810 may be displayed on user device 220. As shown in user interface 810, the user may input search criteria that specifies communication information to request from aggregation server 240. For example, the user may request communications with contact "Stephanie," containing the word "anniversary," and communicated using applications "FriendChat," "Voicemail," "Text Message," "Picture Application," and "E-mail."

As further shown in FIG. 8, user device 220 may send the request, including the search criteria, to aggregation server 240. In some implementations, aggregation server 240 may search a data structure (e.g., data structure 600, FIG. 6) to determine communications that satisfy the search criteria. Additionally, or alternatively, aggregation server 240 may request, from application servers 250, communications that satisfy the search criteria. Aggregation server 240 may provide the communication information, for communications that satisfy the search criteria, to user device 220, where the communication information may be displayed to the user (e.g., via user interface 820). In some implementations, aggregation server 240 may periodically update a local data structure on user device 220, and user device 220 may search the local data structure for communication information, rather than requesting the communication information from aggregation server 240.

User interface 820 may display the communication information requested by the user (e.g., via user device 220). In some implementations, user interface 810 may be displayed on user device 220. As shown in user interface 820, the requested communication information may be organized for display by the type of application used to make the communication. Additionally, or alternatively, the requested communication information may be organized for display by a user, a user account 210, and/or a contact associated with the communication, by a user device 220 used to make the communication, by a date/time the communication was made, by a location from which the communication was made, and/or by the content of the communication.

The information illustrated in FIG. 8, such as contact information, content information, application information, communication information, etc., is provided for explanatory purposes. In practice, implementation 800 may include additional information, less information, or different information than illustrated in FIG. 8.

Figure 9:
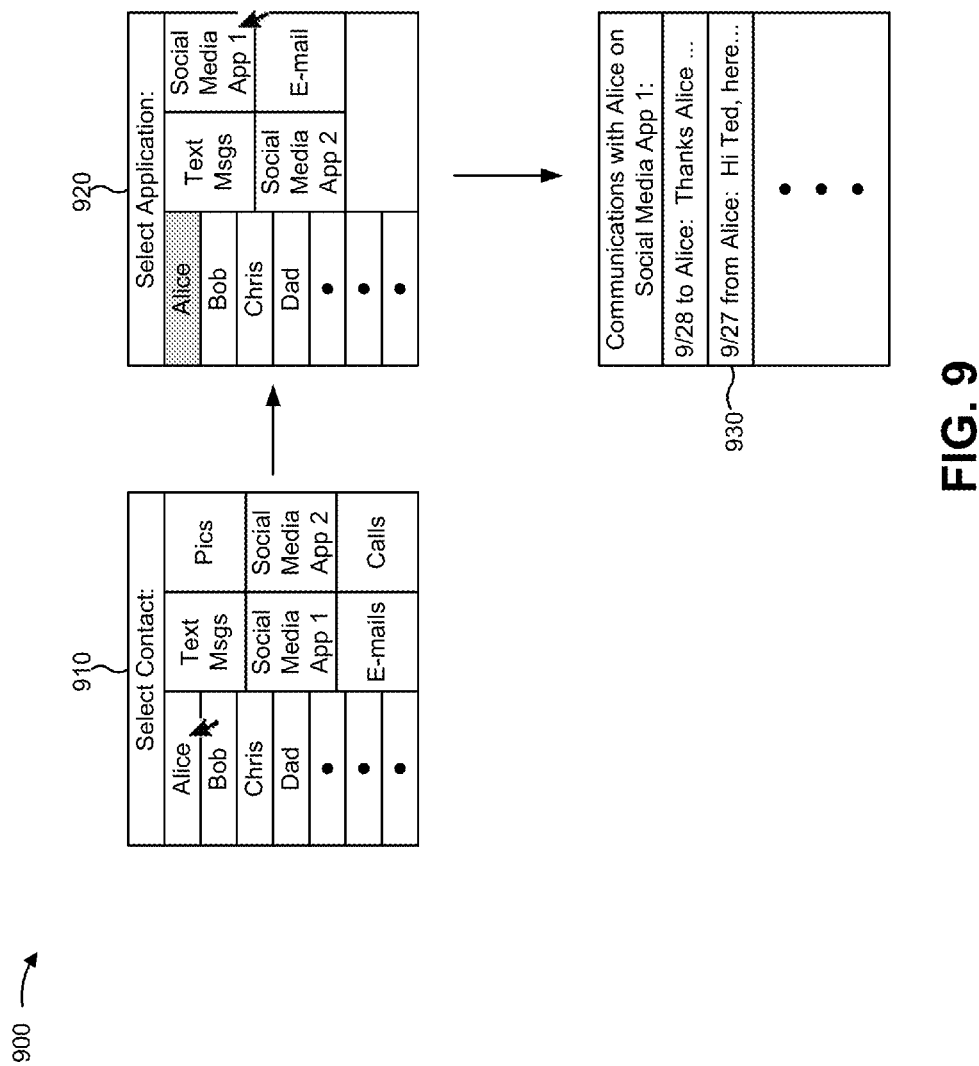

FIG. 9 is a diagram of an example implementation 900 relating to the process shown in FIG. 7. FIG. 9 shows an implementation 900 where a user selects a contact (via user interface 910), and selects an application (via user interface 920), and where communication information is displayed (via user interface 930) based on the selected contact and application.

As shown in FIG. 9, a user may interact with a user interface 910 in order to request particular communication information for display on user device 220. In some implementations, the user request may be transmitted to aggregation server 240, and aggregation server 240 may transmit communication information to user device 220 based on the user request. Additionally, or alternatively, aggregation server 240 may periodically transmit communication information (e.g., stored in the data structure of aggregation server 240) to user device 220, and the user request may be handled locally on user device 220.

As shown in user interface 910, user device 220 may display a list of contacts and/or applications associated with a particular user and/or user account 210. The user may use an input mechanism (e.g., a mouse, a keyboard, a touch screen, etc.) to select a particular contact. For example, the user may select a contact named "Alice," as illustrated.

As shown in user interface 920, user device 220 may update the user interface, based on user selection of a contact, to display a list of applications that have been used by the user to make communications with the selected contact. For example, the user may have used text messaging, social media application 1, social media application 2, and e-mail to communicate with Alice. The user may not have used a picture application or a phone call to communicate with Alice, so these applications may not be displayed on user interface 920. The user may use an input mechanism (e.g., a mouse, a keyboard, a touch screen, etc.) to select a particular application. For example, the user may select "Social Media App 1," as illustrated.

As shown in user interface 930, user device 220 may display communications, with the selected contact, made using the selected application. For example, user device 220 may display communications with Alice made using Social Media App 1, as illustrated. In some implementations, the communications (and/or communication information) may be displayed based on the time at which the communication was made, a location where the communication was made, etc.

The information illustrated in FIG. 9, such as contacts, applications, communication information, etc., is provided for explanatory purposes. In practice, implementation 900 may include additional information, less information, or different information than illustrated in FIG. 9. In some implementations, the functionality described in connection with FIG. 9 may be combined with the functionality described in connection with FIG. 8. For example, user device 220 may allow a user to select and/or search for communication information (e.g., contacts, applications, content, etc.), and may return results that satisfy the selection and/or the search.

Figure 10:
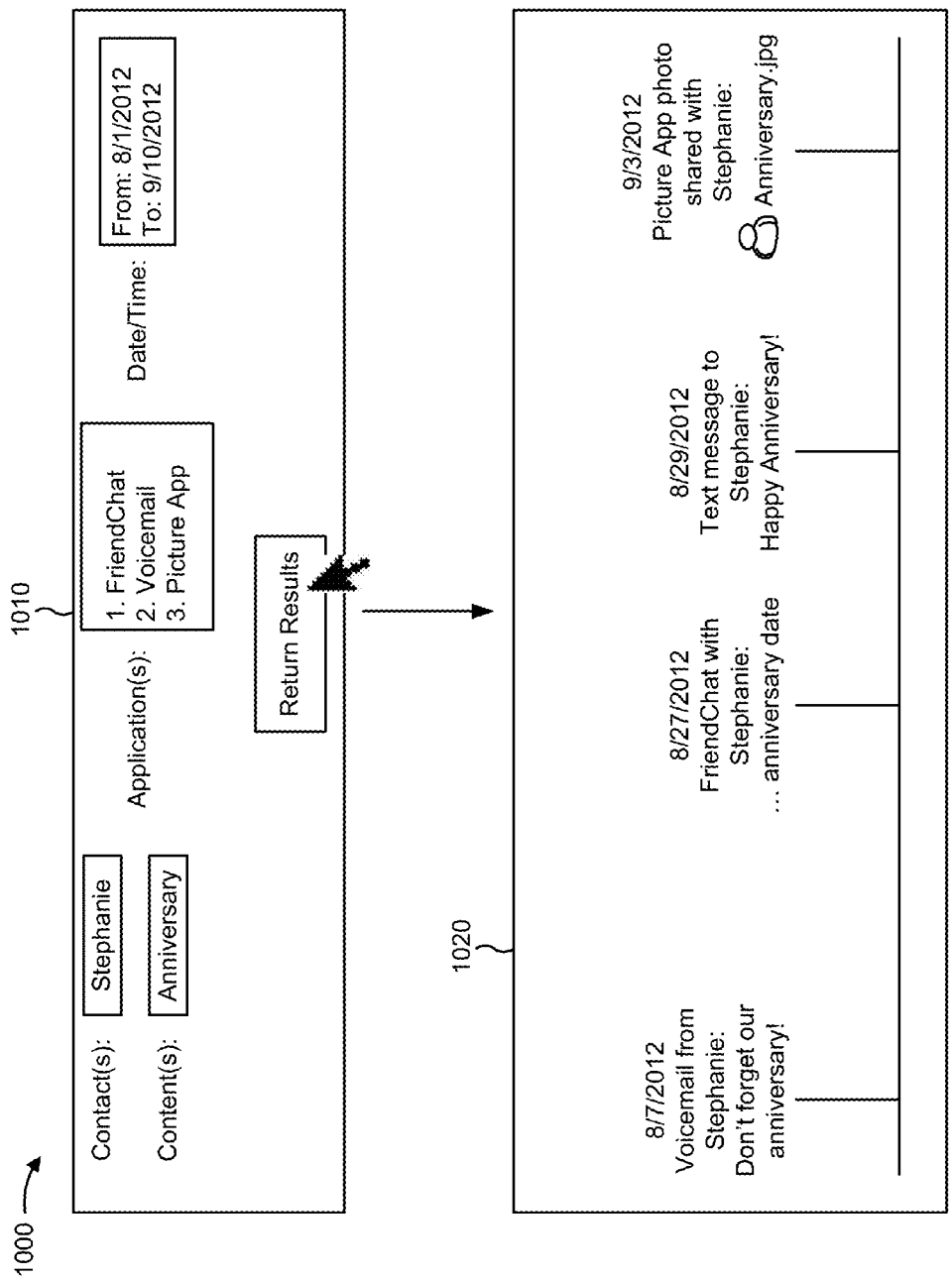

FIG. 10 is a diagram of an example implementation 1000 relating to the process shown in FIG. 7. FIG. 10 shows an implementation 1000 where a user inputs search criteria including time information (via user interface 1010), and the requested communication information is displayed on a timeline (via user interface 1020) based on the time at which a communication associated with the communication information was made.

As shown in FIG. 10, a user may interact with a user interface 1010 in order to request particular communication information from aggregation server 240. In some implementations, user interface 1010 may be displayed on user device 220. As shown in user interface 1010, the user may input search criteria that specifies communication information to request from aggregation server 240. For example, the user may request communications with contact "Stephanie," containing the word "anniversary," communicated using applications "FriendChat," "Voicemail," and "Picture App," and communicated between "Aug. 1, 2012" and "Sep. 10, 2012."

As further shown in FIG. 10, the requested communication information, received from aggregation server 240, may be display on user interface 1020 in a timeline format. In some implementations, user interface 1020 may be displayed on user device 220. As shown in user interface 1020, the requested communication information may be organized for display based on a time the communication was made. For example, user interface 1020 may include a timeline, and communication information may be depicted on the timeline based on a time at which a communication associated with the communication information was made. For example, user interface 1020 may display communication information from left to right (or from top to bottom), with the oldest information being display to the left (or bottom), and the most recent information being displayed to the right (or top).

The information illustrated in FIG. 10, such as contact information, content information, application information, date/time information, communication information, etc., is provided for explanatory purposes. In practice, implementation 1000 may include additional information, less information, or different information than illustrated in FIG. 10.

Figure 11:
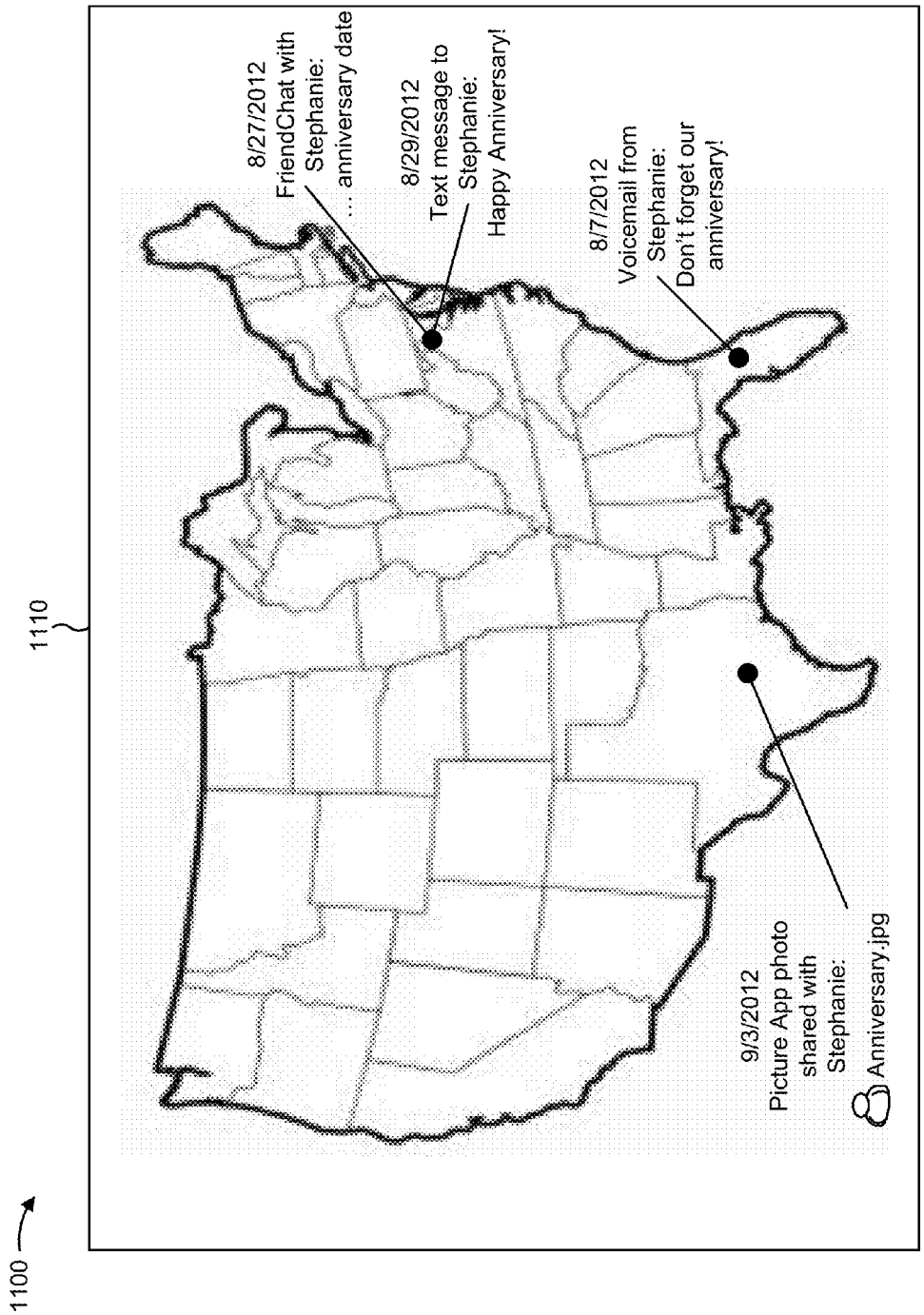

FIG. 11 is a diagram of an example implementation 1100 relating to the process shown in FIG. 7. FIG. 11 shows an implementation 1100 where communication information requested by a user is displayed on a map (via user interface 1110) based on the location of user device 220 when a communication associated with the communication information was made.

As shown in FIG. 11, requested communication information, received from aggregation server 240, may be display on a map displayed by user interface 1110. In some implementations, user interface 1110 may be displayed on user device 220. As shown in user interface 1110, the requested communication information may be organized for display based on a location at which the communication was made. For example, user interface 1110 may include a map, and communication information may be depicted on the map (e.g., using a pointer to a location) based on a location at which user device 220 was located when a communication, associated with the communication information and made by user device 220, was made.

The information illustrated in FIG. 11, such as contact information, content information, application information, location information, communication information, etc., is provided for explanatory purposes. In practice, implementation 1100 may include additional information, less information, or different information than illustrated in FIG. 11.

Implementations described herein may allow users to easily view communications by aggregating communication information across multiple devices and/or applications, and allowing the communication information to be searched, for example, by contact, by content, by time, and/or by location.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive a first request to update a data structure with first communication information from a plurality of applications,
         the first communication information identifying a plurality of communications made, by a particular user, using the plurality of applications, and
         the plurality of applications being associated with a plurality of different modes of communication;
      request, based on the first request, the first communication information from a plurality of different devices storing the first communication information;
      receive the first communication information;
      store the first communication information in the data structure;
      receive one or more criteria that identify requested communications of the plurality of communications,
         the one or more criteria including information associated with a user device used by the particular user in connection with one or more of the plurality of applications;
      search the data structure to determine second communication information,
         the second communication information identifying the requested communications that satisfy the one or more criteria; and
      provide the second communication information to the user device or another device.

2. The device of claim 1, where the one or more processors are further to:
   receive a user credential for accessing the first communication information;
   store the user credential; and
   use the user credential when requesting the first communication information from the plurality of different devices.

3. The device of claim 1, where the plurality of different devices comprise one or more application servers that host the plurality of applications.

4. The device of claim 1,
   where the plurality of different devices comprise one or more user devices used to send or receive the plurality of communications, and
   where the one or more user devices include the user device.

5. The device of claim 1, where the first communication information comprises at least one of:
   information identifying a user associated with a particular communication of the plurality of communications;
   information identifying a user account associated with the particular communication;
   information identifying the user device;
   content included in the particular communication;
   information identifying a time associated with the particular communication;
   information identifying a location associated with the particular communication; or
   information identifying a particular application, of the plurality of applications, associated with the particular communication,
   the one or more of the plurality of applications including the particular application.

6. The device of claim 1,
   where the first request includes information that identifies a particular application, of the plurality of applications, used to make a particular communication, of the plurality of communications,
   where the one or more of the plurality of applications include the particular application, and
   where the one or more processors, when requesting the first communication information, are further to:
      request the first communication information from one or more application servers that host the particular application.

7. The device of claim 1,
   where the one or more criteria comprise information identifying a user associated with the requested communication and information identifying a particular application, of the plurality of applications, used to make the requested communication, and
   where the one or more of the plurality of applications include the particular application.

8. A method, comprising:
   receiving, by a device, a first request to update a data structure with first communication information from a plurality of applications,
      the first communication information identifying a plurality of communications made, by a particular user, using the plurality of applications, and
      the plurality of applications being associated with a plurality of different modes of communication;
   requesting, by the device and based on the first request, the first communication information from a plurality of different devices storing the first communication information;
   receiving, by the device, the first communication information;
   storing, by the device, the first communication information in the data structure;
   receiving, by the device, one or more criteria that identify particular communications of the plurality of communications,
      the one or more criteria including information associated with a user device used by the particular user for one or more of the plurality of applications;
   determining, by the device and using the data structure, second communication information,
      the second communication information identifying the particular communications that satisfy the one or more criteria; and
   providing, by the device, the second communication information the user device or another device.

9. The method of claim 8, further comprising:
   receiving a user credential for accessing the first communication information;
   storing the user credential; and
   using the user credential when requesting the first communication information from the plurality of different devices.

10. The method of claim 8, where the plurality of different devices comprise one or more application servers that host, execute, or store information associated with the plurality of applications.

11. The method of claim 8,
where the plurality of different devices comprise one or more user devices used to send or receive the plurality of communications, and
where the one or more user devices include the user device.

12. The method of claim 8, where the one or more criteria comprise at least one of:
information identifying a user associated with the particular communications;
information identifying a user account associated with the particular communications;
information identifying the user device;
content included in the particular communications;
information identifying a time associated with the particular communications;
information identifying a location associated with the particular communications; or
information identifying a particular application, of the plurality of applications, associated with the particular communications,
the one or more of the plurality of applications including the particular application.

13. The method of claim 8,
where the first request includes information that identifies a particular application, of the plurality of applications, used to make a particular communication, of the plurality of communications,
where the one or more of the plurality of applications include the particular application, and
where requesting the first communication information further comprises:
requesting the first communication information from one or more application servers that host, execute, or store information associated with the particular application.

14. The method of claim 8,
where the one or more criteria comprise information identifying a contact associated with the particular communication, content included in the particular communication, information identifying a time associated with the particular communication, and information identifying an application, of the plurality of applications, used to make the particular communication, and
where the one or more of the plurality of applications include the particular application.

15. A non-transitory computer-readable medium storing instructions, the instructions comprising:
one or more instructions that, when executed by at least one processor, cause the at least one processor to:
receive, from a user, a request to aggregate information associated with the user,
the request identifying a first mode of communication, a second mode of communication, and a type of device used by the user for at least the first mode of communication, and
the second mode of communication being different from the first mode of communication;
obtain, based on the request, first communication information associated with the first mode of communication,
the first communication information relating to a first communication conducted by the user via the first mode of communication and while using the type of device;
obtain, based on the request, second communication information associated with the second mode of communication,
the second communication information relating to a second communication conducted by the user via the second mode of communication, and
the second device being different from the first device;
associate the first communication information and the second communication information with information identifying the user;
receive information identifying the first mode of communication and the second mode of communication;
identify particular information based on the information identifying the first mode of communication and the second mode of communication,
the particular information including a portion of at least one the first communication information or the second communication information; and provide, to a user device associated with the user, the particular information.

16. The non-transitory computer-readable medium of claim 15, where the one or more instructions to receive information identifying the first mode of communication and the second mode of communication comprise:
one or more instructions that, when executed by the at least one processor, cause the at least one processor to:
receive one or more criteria that identify requested communication information, the one or more criteria comprising the information identifying the first mode of communication and the second mode of communication.

17. The non-transitory computer-readable medium of claim 16, where the one or more criteria further comprise at least one of:
information identifying a user account associated with a particular communication;
information identifying a particular user device associated with the particular communication,
the particular user device being of the type of device;
content of the particular communication;
information identifying a time associated with the particular communication; or
information identifying a location associated with the particular communication.

18. The non-transitory computer-readable medium of claim 16, where the one or more criteria further comprise information identifying a contact associated with a particular communication.

19. The non-transitory computer-readable medium of claim 15, where the first device includes one or more application servers that host an application used to communicate via the first mode of communication.

20. The non-transitory computer-readable medium of claim 15, where the first device includes one or more user devices used to send or receive communications via the first mode of communication.

* * * * *